2,923,635

MANUFACTURE OF COLORED GLASS BY ADDITION OF COLORANT TO FLINT GLASS IN A FEEDER

Basil D. Beck, Sr., Bridgeton, N.J., and Arthur B. Swain, Toledo, Ohio, assignors to Owens-Illinois Glass Company, a corporation of Ohio No Drawing. Application January 30, 1957
Serial No. 637,098

1 Claim. (Cl. 106—52)

Our invention relates to the production of glasses of various colors for use in the manufacture of glass containers, tumblers, building blocks, and other glass articles. Glass for use in the manufacture of such articles is commonly made by a continuous process in which the glass batch is melted and fined in a tank of large capacity. The molten glass herein referred to as the base glass flows from the tank through a forehearth from which it is withdrawn to form mold charges. In making colored glasses, the colorant materials may be added to the clear or colorless base glass flowing through the forehearth. Such method, wherein the colorant material is added in the forehearth, permits a quick change from the clear glass to glass of the desired color and vice versa, which is impossible where the glass is colored by adding the colorant material to the base glass batch or to the glass while in the melting tank.

Moreover, in the manufacture of glasses of certain colors as, for example, a blue glass of the formula given hereinafter, adding the coloring materials in the main tank furnace operates to saturate the tank walls with the color material. As a result, it is impossible thereafter to make clear glass within the furnace tank. The absorption of the color materials by the furnace tank walls is due to the high temperatures which prevail within the tank. On the other hand, the comparatively low temperatures required in the feeder forehearth obviate the above condition of saturation or absorbing of the colorant. Accordingly, clear and colored glasses may be made alternately without detrimental effects when the colorant is added within the forehearth.

Colored glasses are important in the glass industry as a good color improves the appearance of the glass and of the articles or products put up in glass containers and enhances their sale in a competitive market. Various colors and shades of color are produced commercially and are known in the trade by various trade names as, for example, Georgia green, Horseradish green, Rum green, Emerald green, Milk Bottle pink, etc.

In developing such colored glasses by the above method in which the colorant is added within the forehearth, considerable difficulty has been experienced owing to the detrimental effect of the decolorizers used in the base glass, which conflict with the colored batch materials added in the forehearth. During experimentation to develop satisfactory colorant feeder operation wherein various colors are produced by the addition of highly enriched colorant to a flint glass in the forehearth, we have encountered difficulty in making a desired color or shade of color as, for example, the desired shade of Georgia green glass. In such experimentation, the results of crucible melts in the laboratory and actual trial runs in the field showed that this difficulty was chiefly due to the fact that the decolorizers present in the flint glass had a detrimental effect on the brightness of the color produced, and also due to the fact that the oxygen balance in the finished Georgia green glass was on the reducing side of neutral. We have further discovered after considerable experimentation that the foregoing difficulty could be overcome by the use of arsenic and sodium nitrate in the highly enriched colorant. The use of these oxidizing agents in the colorant added to the base glass destroyed or counteracted the detrimental effect of the decolorizers in the base (flint) glass and also stabilized the oxygen balance of the color which is essential to produce a bright Georgia green color.

In practicing our invention, the colorant added in the forehearth is usually in the form of a frit. Examples of batch formulae for making the frits are given hereinafter.

The apparatus used in practicing the method in the present invention may be any well known or approved apparatus comprising a melting tank for the clear glass with the forehearth into which the colorant is introduced and mixed with the clear glass. An example of such an apparatus is disclosed in the copending application by Rough and Swain, Jr., Serial No. 578,632, filed April 17, 1956, Apparatus for Mixing Colorant in Glass Furnace Forehearth.

The oxidizing agents introduced into the frit batch not only exert an oxidizing effect upon the ingredients of the frit batch during its melting in the forehearth, but also exert an oxidizing effect upon ingredients such as iron and selenium within the molten base glass from the main tank while within the colorant forehearth. The oxidation of iron changes it from blue-green to yellowish-green thereby increasing its light transmission or brightness. The oxidation of selenium produces a color change in the manner presently described. The sodium nitrate insures the oxidation of all the ferrous iron to ferric iron. It also insures the complete oxidation of the arsenic in the frit batch. The arsenic in the frit batch oxidizes the selenium present in the base (flint) glass and also stabilizes the oxygen balance of the chromium during the operation of the colorant in the forehearth.

The amount of arsenic and sodium nitrate may vary to some extent. We have found that very satisfactory results are given by the use of 27 pounds of arsenic and 27 pounds of sodium nitrate per ton of sand in the frit batch. The amounts of arsenic and sodium nitrate required to give the desired results depend to some extent on the composition of the base glass. For example, the amount of arsenic and sodium nitrate can be reduced where the amount of selenium in the base glass is comparatively small. Quantities from 12 pounds up to 60 pounds of arsenic and 12 pounds up to a maximum of 60 pounds of sodium nitrate per ton of sand in the frit batch may be used. The percentage of arsenic and sodium nitrate in the finished frit should be within a range of about 0.50% to 1.60% $As_2O_3$.

The oxidation of the selenium changes its light absorption properties as follows: The unoxidized selenium has a sharp absorption in the blue portion of the visible spectrum thereby giving a pink or reddish color, whereas the oxidized selenium transmits more of the blue light. This in turn produces a glass of greater brightness. The changes produced by the oxidation of the selenium may be expressed by stating that the unoxidized selenium produces a red or reddish-brown color whereas the oxidized selenium is colorless and in this latter case produces a glass of greater brightness.

A flint glass extensively used commercially and herein referred to as normal flint glass contains 0.00025 to 0.00030% selenium remaining in the glass after the action of the decolorizer used in the glass batch. The pink glass commonly used for making milk bottles, herein referred to as a Milk Bottle pink glass, carries a selenium content of 0.00035 to 0.00055%. When a highly enriched color frit is added to the normal flint glass or to the Milk Bottle pink glass the selenium present masks the color and lowers the brightness to a point where it is not acceptable. We have found that a frit with 0.79% As₂O₃ or As₂O₅ will destroy or prevent the detrimental effect of the selenium present in the normal flint glass and thus produce a color which is satisfactory to the trade. If the base glass to which the color is added is a Milk Bottle pink additional niter and arsenic should be used in the frit. An amount of 0.79% arsenic in the frit is found to be a satisfactory percentage when a flint glass is employed as a base glass.

A general flint glass for the use in the manufacture of containers such as above mentioned is produced as near a colorless glass as it is possible to produce within reasonable costs. A normal light green color that would result from iron impurities in the raw batch materials is offset by complementary colors such as blue from cobalt and pink from selenium. This colorless glass does not transmit as much total light as would be transmitted if cobalt and selenium had been omitted. Accordingly when a highly colored glass frit is added to a decolorized flint glass so as to produce, for example, a definite shade of green or with color characteristics within acceptable limits, the resultant glass lacks desired brightness. The use of oxidizing agents in the frit glass batch as above explained increases the brightness of the color obtained where the colorant glass frit has been added to a decolorized flint glass.

The base glass which is to be colored in the forehearth by the use of the glass frit may be a soda-lime flint or a boro-silicate glass.

The following table, Table I, gives a range of percentages of the several constituents which may be used for base glass compositions adapted for use in the manufacture of flint glassware such as bottles, jars, tumblers, and various other articles.

TABLE I

|  | Range of oxides in base glass compositions, percent |
|---|---|
| SiO₂ | 60 to 75 |
| Al₂O₃ | 0.3 to 10 |
| CaO+MgO | 6 to 15 |
| Na₂O | 12 to 18 |
| K₂O | .0 to 5 |
| BaO | .0 to 5 |

Base glass compositions coming within the ranges above given in Table I may be used with the various frit compositions herein specified. These base glass compositions may have added thereto selenium as a decolorizer in an amount within the range of about 0.00025% to 0.00030%.

The following base glass batches numbered I and II respectively are soda-lime flint batches which we have successively colored by highly enriched colorant frit in accordance with the present invention.

|  | Example I | Example II |
|---|---|---|
|  | Percent | Percent |
| SiO₂ | 72.01 | 71.45 |
| Al₂O₃ | 1.74 | 1.32 |
| Fe₂O₃ | .039 | .037 |
| TiO₂ | .029 | .013 |
| CaO | 11.38 | 8.32 |
| MgO | 1.15 | 5.53 |
| Alkalies | 13.65 | 13.28 |
| Selenium | 0.00025 to 0.00030 | 0.00025 to 0.00030 |

Samples of frit batches for colorants which we have used with soda-lime flint base glasses given in the above Examples I and II are as follows:

Example III

Georgia green frit batch:

| Sand | lbs | 2000 |
|---|---|---|
| Soda ash | lbs | 656 |
| Hi cal limestone | lbs | 632 |
| Sodium nitrate | lbs | 27 |
| Arsenic | lbs | 27 |
| Iron chromite | lbs | 118 |
| Cobalt oxide | oz | 45 |

Theoretical:

| | Percent |
|---|---|
| Cr₂O₃ | 1.78 |
| Co₃O₄ | .096 |
| As₂O₃ | .79 |

Example IV

Dark blue glass frit batch:

| | Lbs. |
|---|---|
| Sand | 2000 |
| Soda ash | 720 |
| Burned lime | 372 |
| Nepheline syenite | 208 |
| Gypsum | 24 |
| Sodium nitrate | 27 |
| Arsenic | 27 |
| Cobalt oxide | 164 |

Theoretical:

| | Percent |
|---|---|
| Co₃O₄ | 5.16 |
| As₂O₃ | 0.72 |

Example V

Horseradish (blue green) frit batch:

| | Lbs. |
|---|---|
| Sand | 2000 |
| Soda ash | 672 |
| Burned lime | 420 |
| Sodium syenite | 176 |
| Nitrate | 27 |
| Arsenic | 27 |
| Copper oxide | 200 |

The following examples numbered VI to X are samples of frit glass ingredients of frits used in making Georgia Green glass. Each example gives the weight in pounds and ounces of the ingredients for the frit batch and also the percentages of the various oxides comprised in the frit.

|  |  | VI | VII | VIII | IX | X |
|---|---|---|---|---|---|---|
| Amber Sand | lbs | 2,000 | 2,000 | 2,000 | 2,000 | 2,000 |
| Soda Ash | lbs | 656 | 656 | 656 | 686 | 686 |
| Limestone | lbs | 632 | 632 | 632 | 632 | 632 |
| Sodium Nitrate | lbs | 27 | 27 | 40 | 40 | 27 |
| Arsenic | lbs | 27 | 27 | 40 | 40 | 27 |
| Iron Chromite | lbs | 116 | 116 | 118 | 118 | 118 |
| Cobalt Oxide | oz | 52 | 40 | 38 | 38 | 45 |
| SiO₂ | percent | 69.33 | 69.35 | 68.93 | 68.52 | 68.88 |
| Al₂O₃ | do | .77 | .77 | .78 | .77 | .77 |
| Fe₂O₃ | do | 1.16 | 1.16 | 1.18 | 1.17 | 1.18 |
| TiO₂ | do | .068 | .068 | .067 | .067 | .067 |
| CaO | do | 11.88 | 11.88 | 11.81 | 11.74 | 11.80 |
| MgO | do | .59 | .59 | .60 | .59 | .59 |
| MnO | do | .015 | .015 | .015 | .015 | .015 |
| Alkalies | do | 13.52 | 13.52 | 13.60 | 14.12 | 14.03 |
| Cr₂O₃ | do | 1.76 | 1.76 | 1.78 | 1.77 | 1.78 |
| Co₃O₄ | do | .112 | .086 | .081 | .081 | .096 |
| As₂O₃ | do | .79 | .79 | 1.17 | 1.16 | .79 |
| (Total Oxides) |  | 2,890.38 | 2,889.64 | 2,907.37 | 2,924.77 | 2,909.41 |
| Ratio Cr₂O₃ to Co₃O₄ |  | 15.6 to 1 | 20.4 to 1 | 21.9 to 1 | 21.9 to 1 | 18.5 to 1 |

The frit is added to the base glass flowing through the forehearth at a rate necessary to produce the desired amount of colorant in the base glass, but such rate obviously will vary with the particular shade or color desired. For example, in making a green glass, using the frit formula given in the above Example III, the frit will be added to the clear glass in a proportion to give 0.015% $Cr_2O_3$ in the finished glass. As another example, in making dark-blue glass with the frit batch given in the above Example IV, the frit will be added to the clear or base glass at a rate to give a percentage of 0.059 to 0.079% cobalt oxide in the finished glass, depending upon the shade of blue desired.

Modifications may be resorted to within the spirit and scope of our invention.

We claim:

In a method of making a colored glass composition, the steps of preparing a substantially colorless molten base glass having the following composition:

| Oxide: | Percent range |
|---|---|
| $SiO_2$ | 60–75 |
| $Al_2O_3$ | 0.3–10 |
| CaO+MgO | 6–15 |
| $Na_2O$ | 12–18 |
| $K_2O$ | 0–5 |
| BaO | 0–5 |
| Selenium | 0.00025–0.00030 | and adding to said molten glass a highly colored frit prepared from the following ingredients in the following proportions:

| Ingredients: | Parts |
|---|---|
| Sand | 2000 |
| Soda ash | 656–720 |
| CaO | 354–420 |
| Nepheline syenite | 0–208 |
| $NaNO_3$ | 12–60 |
| $As_2O_3$ | 12–60 | and 118–164 parts of colorant selected from the group consisting of iron chromite and cobalt oxide, the amount of frit added being sufficient to yield a final colored glass composition containing about 0.015% $Cr_2O_3$ when iron chromite is used as the colorant and containing from 0.059 to 0.079% cobalt oxide when the latter is used as the colorant.

References Cited in the file of this patent
UNITED STATES PATENTS

| | | |
|---|---|---|
| 2,034,994 | Sharp et al. | Mar. 24, 1936 |
| 2,309,070 | Austin et al. | Jan. 19, 1943 |
| 2,508,070 | Lyle | May 16, 1950 |
| 2,699,399 | Armistead | Jan. 11, 1955 |